United States Patent [19]
Hunter et al.

[11] 3,977,789
[45] Aug. 31, 1976

[54] SCANNING DIFFERENTIAL PHOTOELECTRIC AUTOCOLLIMATOR

[75] Inventors: George C. Hunter; Carl A. Zanoni, both of Middletown, Conn.

[73] Assignee: Zygo Corporation, Middlefield, Conn.

[22] Filed: Apr. 7, 1975

[21] Appl. No.: 565,525

[52] U.S. Cl. .............................. 356/120; 356/124; 356/167; 356/212; 356/237; 356/239
[51] Int. Cl.² .................. G01B 11/30; G01N 21/48
[58] Field of Search ........... 356/120, 124, 165, 167, 356/168, 212, 237, 239; 250/563, 572

[56] References Cited
UNITED STATES PATENTS

| | | | |
|---|---|---|---|
| 3,761,179 | 9/1973 | Plummer et al. | 356/120 |
| 3,885,875 | 5/1975 | Rosenfeld et al. | 356/167 |

*Primary Examiner*—Vincent P. McGraw
*Attorney, Agent, or Firm*—Milton Zucker

[57] ABSTRACT

An apparatus is disclosed which automatically measures the geometrical deviations of a reflecting surface from a reference surface, and which also can be used to automatically measure the deviations of some light beam deviating property of a transparent article from a reference in a non-contacting manner over a plurality of lines on the article being measured. A narrow beam of laser light is scanned simultaneously in a raster pattern over the test article and a reference surface. A uniformly rotating multi-faceted reflector device which has suitably chosen pyramidal angles and which is placed near the focal point of a collimating lens produces the scaning, collimated laser beam. A transparent optical element containing a partially reflective, partially transmissive reference surface is placed in the scanning laser beam between the collimating lens and the test article to produce two beams, namely, a reference beam which is reflected from the reference surface and a measurement beam which is transmitted by the reference surface. The reference beam is collected by the collimating lens and is focused onto a first two-axis photoelectric position sensor. The measurement beam is either reflected by the surface of a reflective test article or for a transparent test object autoreflected by a master reflector surface for double-pass transmission through the transparent test article. After probing the test article, the measurement beam passes back through the optical element containing the reference surface and is focused onto a second two-axis photoelectric position sensor by the collimating lens. The reference beam and the measurement beam, after it has probed the test article, are each tilted slightly with respect to the optical axis of the collimating lens to separate the two light spots formed by focusing these beams. The information obtained from the two photodetectors can be processed electronically or by computers to obtain desired information about the differences between the reference surface and the test object. Preferably, electronic circuitry processes the signals generated by the two photoelectric position sensors to provide outputs indicative of the geometrical deviations of the test article surface or the deviations of some light beam deviating property of the test article. A signal indicating whether the test article is within or outside a predetermined tolerance range is also available.

6 Claims, 12 Drawing Figures

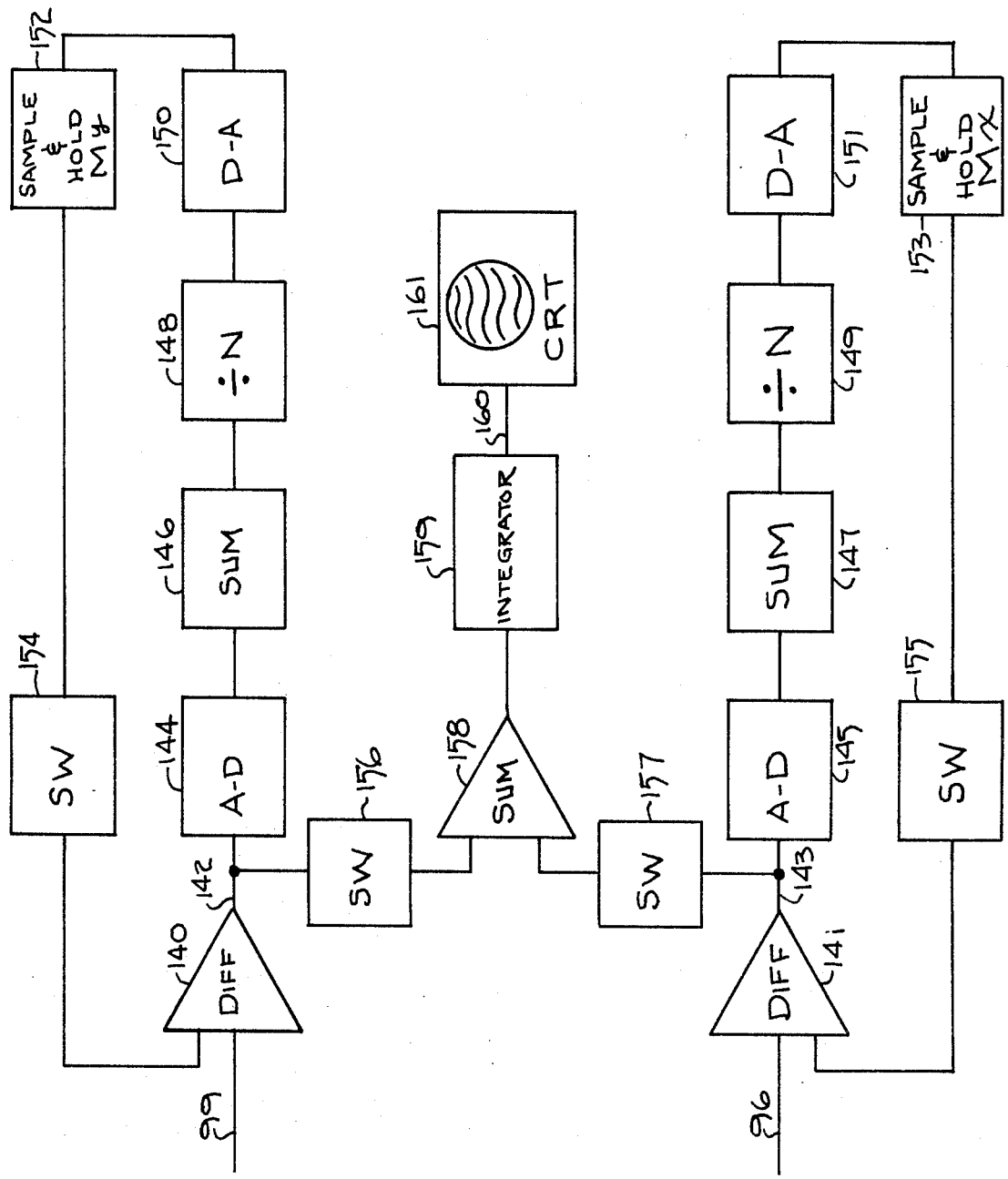

SCANNING DIFFERENTIAL PHOTOELECTRIC AUTOCOLLIMATOR

BACKGROUND OF THE INVENTION

Field of the Invention

The present invention is an apparatus and method useful for measuring the geometrical deviations of a reflecting surface from a reference surface and also for measuring the deviations of some light beam deviating property of a transparent article from a reference. It is especially suited for measuring large quantities of test articles quickly, automatically, and economically with non-contacting, non-destructive means.

The Prior Art

In many industrial operations it is necessary to measure the geometrical deviations of a reflecting surface and to measure the deviations of some light beam deviating property of large quantities of semi-manufactured and finished products.

Previously known contacting techniques for measuring deviations in surface geometry are not feasible for measuring large quantities of articles. They generally require contact between the test article surface and a reference surface or a probe, thereby imposing stringent requirements of care on the operation to prevent damage to the test article. Optical interference and Moire fringe are typical methods using a reference surface. Both methods yield a fringe pattern corresponding to contour lines of constant elevation. The departures of the fringe pattern from a reference pattern are indicative of the deviations of the test article's surface geometry. An operator must visually evaluate the fringe pattern. If the surface deviations correspond to more than one fringe and are irregular, the resulting fringe pattern is so complex as to preclude easy interpretation and quantitative use.

Measuring machines which move either a contacting or non-contacting probe over the test article surface are generally quite slow because of the time required to trace a useful number of contours. Furthermore, the need for precise mechanical scanning is costly, and great care is needed to assure reliable operation.

Optical sensors have advantages because of the nature of light itself. The principal advantages are:
1. Optical measurements can be extremely accurate.
2. A light beam can be scanned rapidly and precisely.
3. Light variations are directly convertible to electrical signals.
4. The response time is limited to that of the photodetector and its electronics.
5. They do not require direct mechanical contact between the sensor and the object to be measured.
6. Light can be used to carry out transmissive measurements.
7. Light does not chemically deteriorate or deform the surface under test.
8. The distance from the sensor to the object to be measured can be large.
9. The measurements are independent of the chemical composition of the object.

Prior art non-contacting optical methods include interferometry, image blur detectors, and hybrid interference - Moire apparatus.

Interferometers provide high sensitivity and accuracy. The interferometer output is a fringe pattern corresponding to a pattern of contour lines. The departures of the fringe pattern from a reference pattern are indicative of the deviations of the surface geometry or the deviations of some transmissive properties of the test article. An operator must visually evaluate the fringe pattern. If the deviations correspond to more than one fringe (typically $\lambda/2$ or 0.000012 in.) and are irregular, the resulting fringe pattern is so complex as to preclude easy interpretation and quantitative use. By photoelectrically sensing the phase information in the fringe pattern, it is, of course, possible to obviate the above problems, but at a substantial increase in complexity and cost.

Essentially, for many applications, an interferometer is too sensitive. An interferometer's sensitivity can be reduced by working at high angles of incidence to the test article surface. To achieve a reasonable decrease in sensitivity, the angle of incidence is very large, e.g., 80° – 85°. While the oblique incidence interferometry may be useful for some applications, problems with vignetting, the desire for variable sensitivity, and the need to measure transparent articles preclude its use for many others.

An apparatus for measuring automatically the flatness of mirrorreflecting surfaces is disclosed in Plummer et al. U.S. Pat. No. 3,761,179 issued Sept. 25, 1973. This technique is suited to measuring large quantities of articles and is essentially based on image blur sensing for its operation. It is essentially a photoelectric Hartmann test. Therefore, it works by sensing variations in light intensity produced by the nonflatness of the mirror surface under test. While this technique is useful for some applications, it is quite complex optically, mechanically, and electronically. Since it depends on variations of the light intensity to transduce the surface deviations, the outputs are not easily related to the surface topography.

Moire fringe techniques are also used to obtain contours of surfaces. Although the Moire fringe techniques are less sensitive than optical interferometry, a range of dimensions exists between these two techniques where neither is very useful.

An apparatus and method of measuring surface irregularities using a hybrid Moire-interference technique is disclosed in Jaerisch et al. in U.S. Pat. No. 3,858,981 issued Jan. 7, 1975. Since the output of the apparatus is a fringe pattern, a human operator is required to extract and to quantify the output. In addition, the apparent surface irregularities manifest in the output fringe pattern are those with respect to some datum plane of the apparatus and not with respect to the best fitting least squares plane. Therefore, this technique is extremely cumbersome, time consuming and expensive since a human operator is an integral part of the apparatus.

While these prior art techniques for measuring surface profiles are useful for some measurements, they cannot be used for accurate measurements required in many industrial operations. For example, in the electronics industry it is desirable to measure the surface profile and nonflatness of the silicon wafers used in the manufacture of integrated circuits. Also, in the electronics industry it is desirable to measure the surface profile and nonflatness of the glass photomasks used in the photolithography portion of the manufacturing process. In each of these examples, the nonflatness of the surface is in the dimentional range from 0.000005 in. to 0.0005 in., i.e., $\lambda/5$ to $25\lambda$, where $\lambda = 6328A$, the surfaces are specular reflectors, and large quantities of articles must be measured very rapidly. Similar requirements exist in the optical industry where a great variety of reflective surface shapes, e.g., flat, spherical and cylindrical, and transparent products, e.g., lenses, lens assemblies, windows, and prisms, must be measured in large quantities accurately, rapidly and economically. To this end, measurement apparatus is required for both reflective surfaces and transparent articles which rapidly yields a signal indicating whether the deviations of the test article are within or outside a predetermined tolerance range.

It has been suggested (Harrison - IBM Technical Disclosure Bulletin Vol. 13 No. 3 August 1870 pages 789–790) that scanning of a specular to semi-specular surface with a collimated laser beam, and measuring the displacement of the reflected beam with a photoelectric position sensor, could be used to measure the surface profile of the surface. This technique is well suited to the problem; but the method suggested by Harrison has certain difficulties. In order to get the desired results, it is necessary for the surface of the test article to be perpendicular to the incident light beam, or the resultant profile measurement will include the tilt of the surface. The necessity for such an adjustment precludes rapid measurements, since the mechanical tilt changes from sample to sample. Moreover, Harrison uses his collimating lens off-axis, thereby introducing a source of error into his measurements. Most importantly, Harrison's apparatus only provides a surface profile along one line of the test article surface.

In the copending application of Rosenfeld and Zanoni, Ser. No. 492,781 filed July 29, 1974, now U.S. Pat. No. 3,885,875 issued May 27, 1975, and assigned to the assignee of this application, there is disclosed a surface profilometer which is capable of rapidly measuring the surface profile and nonflatness of many articles, independent of the tilt of the surface, with easily variable sensitivity, and good accuracy along a scan line.

The device of the above application presents some problems in use. One of the problems is that for some applications, the optical system of the device must be extremely good — and hence expensive — to avoid constant errors in the device.

In addition, the device, as produced on a commercial scale, yields a measurement beam with a slight dither in it. Moreover, since it measures the profile of the surface one line at a time, it is difficult to map the contours of an entire surface accurately, due to problems encountered in moving the measurement beam and the test article relative to each other. A solution for these problems — raster scanning with a multi-faceted reflector with suitably chosen pyramidal angles — is disclosed in the copending Rosenfeld and Zanoni application entitled "Scanning Photoelectric Autocollimator" filed on Mar. 31, 1975, Ser. No. 563,326.

Objects of this Invention

The principal object of the present invention is the provision of means, in a surface profilometer, for obtaining differential measurements against a reference, thereby cancelling out repeatable optical errors in the profilometer.

Statement of the Invention

In accordance with the instant invention, we provide 1) a source of light, most preferably polarized light from a laser, which produces a narrow beam of light 2) means for rotationally scanning said beam 3) means for collimating said rotationally scanned beam to produce a collimated, linearly scanning beam which preferably moves in a raster pattern 4) means for passing said collimated, scanning beam over a partially reflective, partially transmissive reference object having light beam deviating properties of the same general characteristics as the test object to be measured, to produce a reflected reference beam and a transmitted measurement beam for probing the test article 5) means for collecting the transmitted measurement beam after it has probed the test article to provide an autoreflected, collected measurement beam 6) means for focusing the reflected reference beam and the autoreflected collected measurement beam onto separate photoelectric position sensors and 7) means for comparing the outputs of said two photodetectors to obtain information with respect to the differences in the light beam deviating properties of the test object and the reference object. The preferred method of separating the two measurement beams is to tilt the reference object slightly with respect to the entering collimated beam.

It is obvious that with either a reflective or a transparent test object, it is the light beam deviating property of the object which is primarily being measured; this can be processed to yield surface profiles for reflective test objects, and transmissive properties for transparent test objects.

For reflective test objects, the comparing means includes 8) means for yielding outputs indicative of the two first spatial derivatives of the surfaces profiles and is combined with 9) further means for processing the outputs of the position sensors to yield the surface profiles and 10) means for processing the outputs to yield the surface profiles independent of the tilt or the alignment of the article.

For transparent test objects, a master reflective surface is provided, so that the scanning beam, after it passes through the test object, is autoreflected for double-pass transmission through the test object; the output comparing means 7) then yields information indicative of the relative light beam deviating properties of the test object and the reference object.

THE DRAWINGS

In the drawings,

FIG. 9 is a schematic block diagram of the circuitry used to yield signals indicative of the properties of a reflective test article surface which are independent of the tilt of the reflective test article surface relative to the apparatus.

DETAILED DESCRIPTION OF THE INVENTION

Figure 1:
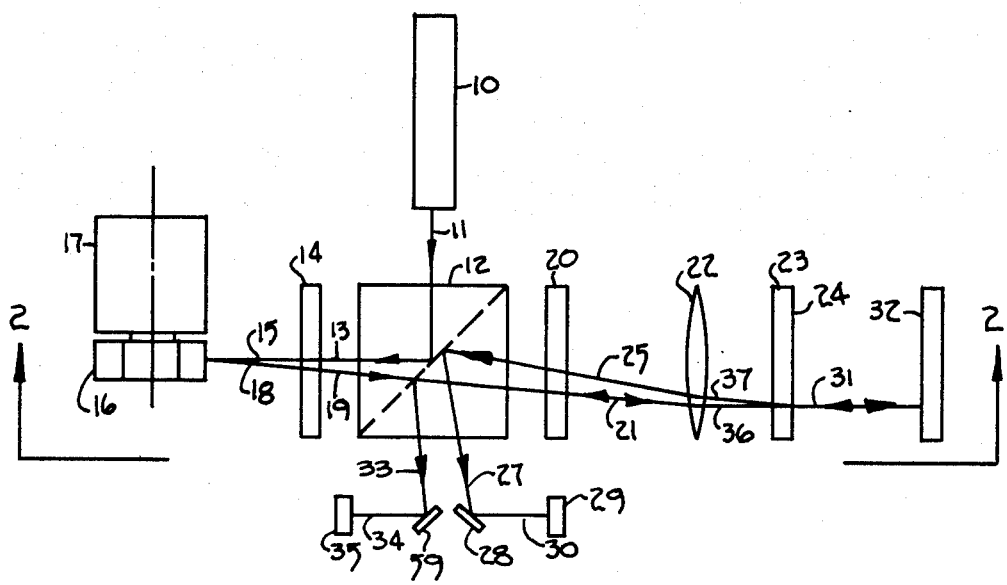
FIG. 1 is a schematic diagram showing a top view of the apparatus' optical system.
Figure 2:
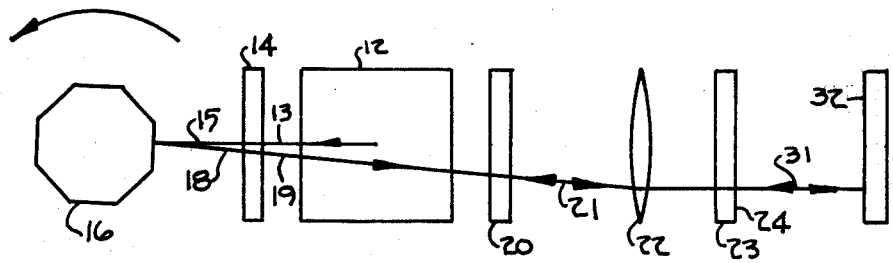
FIG. 2 is a sectional view of the apparatus' optical system along the line 2—2 of FIG. 1.

Description and Explanation of FIGS. 1 and 2.

While the apparatus has application for a wide range of radiation sources, the following description is taken by way of example with respect to an optical measuring system. The term "radiant energy" as used herein includes, but is not limited to electromagnetic energy of all frequency ranges.

FIG. 1 is a schematic diagram showing a top view of the apparatus' optical system.

A light source such as a tungsten bulb, xenon bulb, light-emitting diode, laser diode, or other source of radiant energy, and most preferably a gas laser, (10) provides optical energy for the narrow, nearly collimated, linearly polarized beam (11) in FIG. 1. The polarization vector of beam (11) is normal to the plane of FIG. 1. Polarization beamsplitter (12) totally reflects beam (11) to produce beam (13) which is parallel to the optical axis of collimating lens (22). The polarization vector of beam (13) is also normal to the plane of FIG. 1. A polarization beamsplitter transmits the $p$ polarization component of the input beam and reflects the $s$ polarization component of the input beam. The $p$ label denotes the polarization component in the plane defined by the incident beam and the normal to the beamsplitter surface. The $s$ label denotes the polarization component perpendicular to the plane defined by the incident beam and the normal to the beamsplitter surface. The orientation of the polarization of the linearly polarized beam (11) is such that is it entirely $s$ component. The quarter-wave phase retardation plate (14) has its optic axis oriented at 45° with respect to the direction of polarization of the incident beam (13). The linearly polarized light is thusly converted to a circularly polarized beam (15). The reason for using a polarization beamsplitter in conjunction with a quarter-wave phase retardation plate is to provide minimum loss of radiant energy of the beamsplitter. This configuration increases the light throughput efficiency by about a factor of four over a conventional 50—50 beamsplitter for a linearly polarized incident beam. In addition, use of the beamsplitter assures on-axis use of the collimating lens (22). Beam (15) is reflected by the uniformly rotating, multi-faceted reflector device (16) to produce the angularly scanned beam (18). The device (16) is preferably designed so that the pyramidal angle of each reflecting facet is offset relative to each of the other reflecting facets sufficiently so that the reflection from each facet is separated from the reflection of every other facet. By so separating the reflections, the plurality of facets produces a plurality of scanning lines, which produce a raster pattern which can be made to fall over the entire surface of the test article, permitting mapping of an entire surface with each complete rotation of the multi-faceted reflector device.

Figure 3:
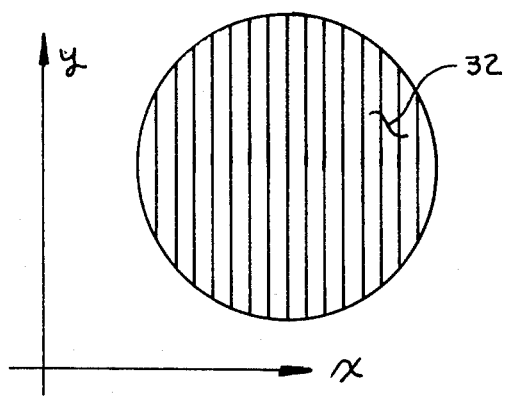
FIG. 3 is a plan view of the scan pattern on the test article.

Obviously, it is desirably to have the raster regular, with comparatively equal spacings. This is difficult to accomplish with a fixed facet prism, so that preferably we use a multi-faceted reflector device in which the position of the facets can be adjusted relative to each other. Such devices for producing reflected scanning raster patterns are known - for example, see Ives et al. U.S. Pat. No. 3,529,884 issued Sept. 22, 1970: The facets can be adjusted as desired to get an evenly spaced raster over the test surface, as shown in FIG. 3.

Furthermore, an adjustable multi-faceted reflector device eliminates the aforementioned dither induced problem.

The device (16) is located so that the reflecting facets are at the back focal point of collimating lens (22). The device (16) is rotated uniformly by the electromechanical transducer (17), which is comprised of a motor and bearing assembly. When circularly polarized beam (18) passes through the quarter-wave phase retardation plate (14), beam (19) is formed with a pure $p$ polarization state. Therefore beam (19) is totally transmitted by the polarization beamsplitter (12). After emerging from polarization beamsplitter (12), beam (19) passes through the second quarter-wave phase retardation plate (20) which has its optic axis oriented at 45° with respect to the direction of polarization of beam (19). The linearly polarized beam (19) is thusly converted to a circularly polarized beam (21). The reason for using this quarter-wave phase retardation plate is the same as mentioned earlier. Collimating lens (22) converts the angularly scanned beam (21) into a uniformly, linearly scanned beam (36).

Beam (36) impinges on the partially reflective transmission element (23) which has a partially reflective flat reference surface (24). The beam (37) is the portion of beam (36) which is reflected by the reference surface (24). Surface (24) is tilted slightly from normality to beam (36) so that beam (37) is tilted with respect to beam (36). Beam (37), hereafter denoted the reference beam, is collected by lens (22), to form beam (25), has its polarization converted to pure $s$ state by the quarter-wave phase retardation plate (20) and is totally reflected by polarization beamsplitter (12) to produce beam (27) which is focused onto the two-axis photoelectric position sensor (29) after being reflected by mirror (28). The position sensor (29) provides outputs indicating the Cartesian coordinates of the spot of light on its photosensitive surface.

The beam (31) is the portion of beam (36) which is transmitted by the reference surface (24). Beam (31), hereafter denoted the measurement beam, is incident upon the test article (32). For a flat, specularly reflective article as shown in FIG. 1, the surface (32) should be normal to the measurement beam (31) to produce an autoreflection. The circularly polarized beam reflected by surface (32) passes through the transmission element (23), is collected by lens (22), has its polarization converted to pure $s$ state by the quarter-wave retardation plate (20) and is totally reflected by polarization beamsplitter (12) to produce a beam (33) which is focused onto the two-axis photoelectric position sensor (35) after being reflected by mirror (59). The position sensor (35) provides outputs indicating the Cartesian coordinates of the spot of light on its photosensitive surface.

The motion of the spot on position sensor (35) produced from the measurement beam relative to the motion of the spot on position sensor (29) produced by the reference beam is solely indicative of the properties of the test article independent of the intrinsic instrumental errors. The intrinsic instrumental errors arise from the imperfect quality of the optical components and elements used as well as from the errors induced by the misalignment of optical elements.

Introduction of transmission element (23) with its reference surface (24) makes the measurement of article (32) a differential measurement. Not only can repeatable system errors be eliminated, but by placing a master reference surface on the transmission element, the apparatus will then provide the deviations of subsequently measured test articles from the master surface. This feature can be particularly useful for complex or irregular test articles.

Description and Explanation of FIG. 3

FIG. 3 shows the raster pattern followed by beam (31) as it scans the test article (32). Each line of the raster is produced by one of the reflector facets of the device (16). The motion along each line of the raster is produced by the rotation of the reflector device (16). The spacing between two adjacent scan lines is set by adjusting the offset in the pyramidal angle of adjacent reflector facets. By appropriately adjusting the pyramidal angles of the device (16), the plurality of facets produces a plurality of scanning lines, which produce a raster pattern which can be made to fall over the entire surface of the test article, permitting mapping of an entire surface with each complete rotation of the multifaceted reflector device (16).

Description and Explanation of FIG. 4.

FIG. 4 illustrates typical arrangements in which the apparatus is used to measure test articles with reflective surfaces: 4(a) a concave spherical surface and 4(b) a convex spherical surface.

Figure 4A:
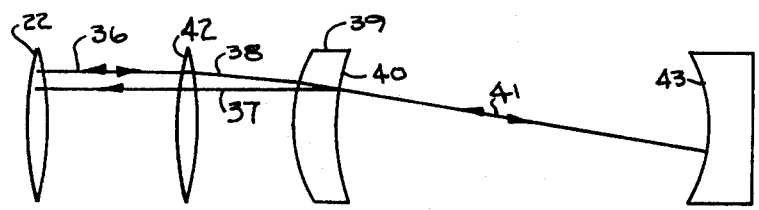
FIG. 4 illustrates typical arrangements in which the apparatus is used to measure test articles with reflective surfaces: 4(a) a concave spherical surface and 4(b) a convex spherical surface.

Referring to FIG. 4(a), a decollimating lens (42) is introduced in the raster scanned beam (36) to produce a beam (38). Beam (38) impinges on a partially reflective transmission element (39) which has a partially reflective spherical reference surface (40). The beam (37) is the portion of beam (38) which is reflected by the reference surface (40). Surface (40) is tilted slightly from normality so that beam (37) is tilted with respect to beam (36). Beam (37) is the reference beam.

The beam (41) is the portion of beam (38) which is transmitted by the spherical reference surface (40). Beam (41) is the measurement beam. The test article (43) which has a concave reflective surface is placed so that the center of curvature of the concave surface coincides with the center of curvature of the reference surface (40) and such that surface (43) autoreflects the beam (41). The combination of the decollimating lens and the spherical transmission element with a suitably placed spherical reflector produces an autoreflected measurement beam similar to that shown in FIG. 1 for a flat reflective surface. As in FIG. 1, the relative motion of the light spots produced from the reference and measurement beams is indicative of the properties of the test article.

Figure 4B:
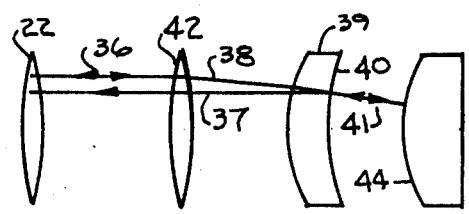

Referring to FIG. 4(b), the center of curvature of the convex test surface (44) is coincident with the center of curvature of the reference surface (40) such that surface (44) autoreflects the beam (41). Similarly to 4(a), this configuration assures that an autoreflected beam is produced after the measurement beam (41) has been reflected by the test article surface.

Description and Explanation of FIG. 5.

FIG. 5 illustrates typical arrangements in which the apparatus is used to measure the light beam deviating properties of a transparent article: 5(a) a window, 5(b) a prism, 5(c) a lens.

Figure 5A:
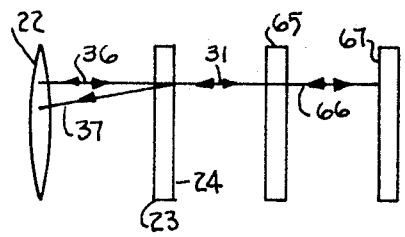
FIG. 5 illustrates typical arrangements in which the apparatus is used to measure the light beam deviating properties of a transparent article: 5(a) a window, 5(b) a prism, 5(c) a lens.

In FIG. 5(a) the scanning measurement beam (31) passes through the transparent window (65). The transmitted beam (66) is autoreflected by a flat master reflector (67). The beam (66) then passes back through the window (35) and the flat transmission element (23) to be collected by lens (22) of the apparatus. The angular orientation of master reflector (67) is adjusted so that the beam collected by lens (22) is an autoreflection of beam (36).

Figure 5B:
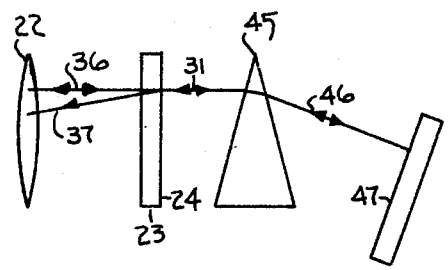

In FIG. 5(b), the scanning measurement beam (31) passes through and is deflected by the transparent prism (45) to produce beam (46). The flat master reflector (47) autoreflects beam (46) so that it is collected by lens (22) after passing through the transmission element (23).

Figure 5C:
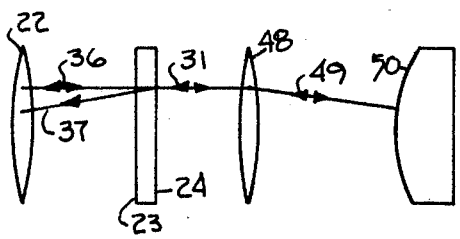

In FIG. 5(c), the scanning measurement beam (31) passes through and is focused by the lens to be measured (48) to produce beam (49). The spherical master reflector (50) is placed so that the center of curvature of its master spherical surface coincides with the focal point of lens (48) and such that surface (50) autoreflects beam (49).

Figure 6:
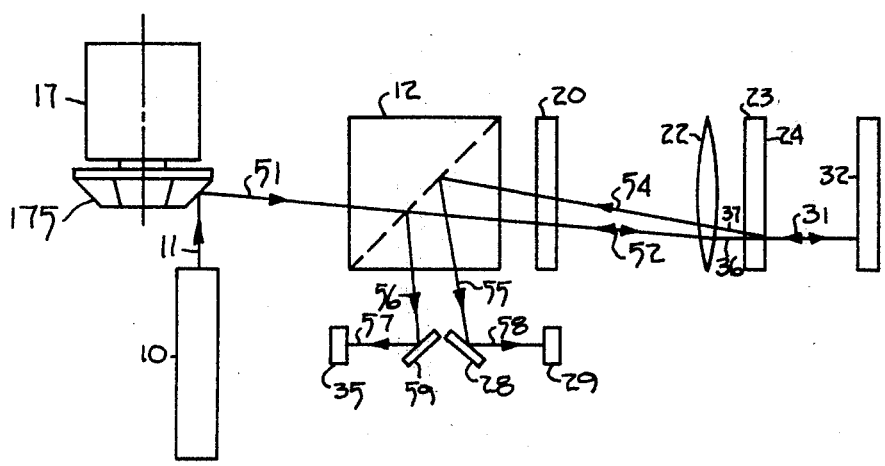
FIG. 6 is a schematic of an alternative embodiment of the optical system.

Description and Explanation of FIG. 6.

FIG. 6 is a schematic of an alternative embodiment of the optical system.

The apparatus of FIG. 6 differs from that of FIG. 1 in that only one phase retardation plate is required and the linear speed of the scanning measurement beam is reduced by a factor of two for a given rotational speed of the reflector device. The first difference is advantageous from the point of view of simplicity and economy. The second difference is desirable since the requirements on the speed of the electronics can be relaxed.

In FIG. 6, the laser (10) provides optical energy for the narrow, nearly collimated, linearly polarized beam (11). The polarization vector of beam (11) is in the plane of FIG. 6. Beam (11) is reflected by the uniformly rotating, multi-faceted reflector device (175) to produce the angularly scanned beam (51). The device (175) is preferably designed so that the pyramidal angle of each reflecting facet is offset relative to each of the other reflecting facets similar to the device (16) of FIG. 1.

The device (175) is located to that the reflecting facets are at the back focal point of collimating lens (22). The device (175) is rotated uniformly by the electro-mechanical transducer (17), which is comprised of a motor and bearing assembly.

Beam (51) is totally transmitted by polarization beamsplitter (12). The quarter-wave phase retardation plate (20) has its optic axis oriented at 45° with respect to the direction of polarization of the incident beam (51). The linearly polarized light is thusly converted to a circularly polarized beam (52). The reason for using this quarter-wave phase retardation plate is the same as mentioned earlier. Collimating lens (22) converts the angularly scanned beam (52) into a uniformly, linearly scanned beam (36). Beam (36) is split into a reference beam (37) and a measurement beam (31) at the reference surface (24), and the reference beam (37) is circularly polarized and is collected by the collimating lens (22) to form the focused beam (54). Beam (54) has its polarization converted to pure s state by the quarter-wave phase retardation plate (20) and is totally reflected by polarization beamsplitter (12) to produce beam (55) which is focused onto the two-axis photoelectric position sensor (29) after being reflected by mirror (28). The position sensor (29) provides outputs indicating the Cartesian coordinates of the spot of light on its photosensitive surface. The autoreflected measurement beam (31) is similarly collected and focused onto its respective position sensor (35) after passing through the reference element (23).

Figure 7:
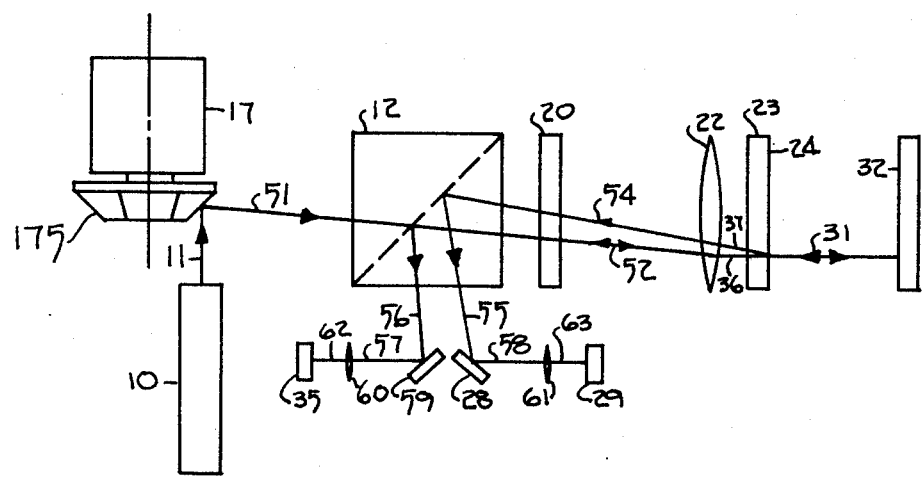
FIG. 7 is a schematic diagram showing a modified embodiment of the apparatus.

Description and Explanation of FIG. 7.

FIG. 7 is a schematic diagram showing a modified embodiment of the apparatus.

FIG. 7 shows a modification of the device of FIG. 6 if greater accuracy is desired. Magnifying lenses (60) and (61) are positioned in the path of beams (57) and (58) so that they image the focus of beams (57) and (58) onto the position sensors (35) and (29), thereby increasing the sensitivity of the device, and assuring greater accuracy but less dynamic range.

Figure 8:
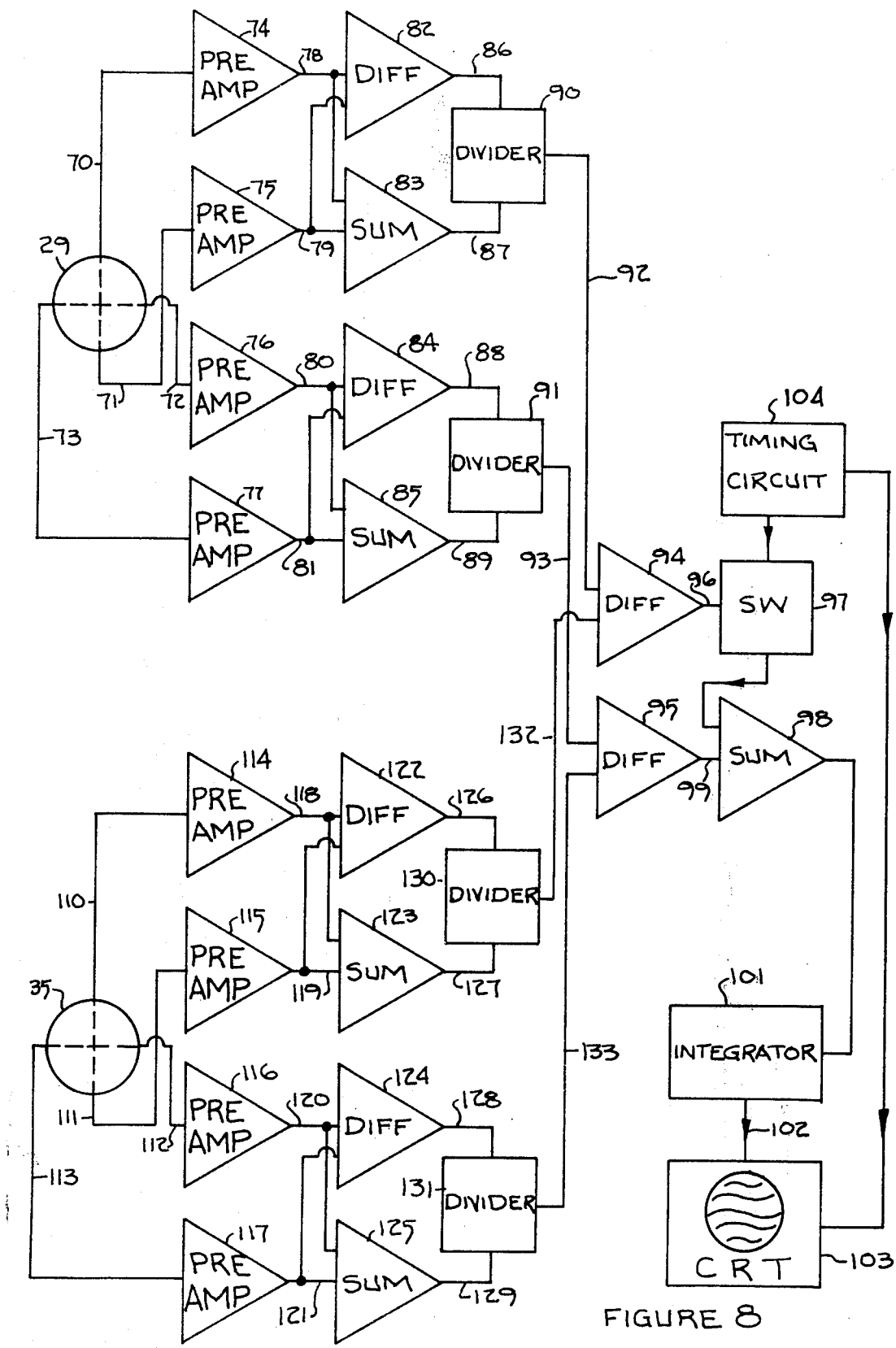
FIG. 8 is a schematic block diagram of the circuitry used to process the outputs of the two two-axis photoelectric position sensors to yield signals indicative of the light beam deviating properties of the test article.

Description and Explanation of FIG. 8.

FIG. 8 is a schematic block diagram of the circuitry used to process the outputs of the two two-axis photoelectric position sensors to yield signals indicative of the light beam deviating properties of the test article.

If the surface of a reflective test article is represented as $Z(x,y)$, then the Cartesian coordinates of the spot of light on the position sensor (35) relative to those on position sensor (29) are given by $$X(x,y) = 2f \left[ \frac{\delta Z(x,y)}{\delta x} - M_x \right] \quad (1)$$

$$Y(x,y) = 2f \left[ \frac{\delta Z(x,y)}{\delta y} - M_y \right] \quad (2)$$

where $f$ is the focal length of lens (22) and $M_x$ and $M_y$ are the x and y components respectively, of the angular deviation, i.e., tilt, of the surface (32) from perfect perpendicularity to beam (31). $M_x$ and $M_y$ are constants when the apparatus and test article are fixed relative to each other. The preceding equations can be rewritten in the form $$\frac{\delta Z(x,y)}{\delta x} = \frac{X(x,y)}{2f} - M_x \quad (3)$$

$$\frac{\delta Z(x,y)}{\delta y} = \frac{Y(x,y)}{2f} - M_y \quad (4)$$

Thus, knowing $X$, $Y$ and $f$ yields $\delta Z/\delta x$ and $\delta Z/\delta Y$ to within unknown constants $M_x$ and $M_y$, respectively. It will be shown later how the unknown constants $M_x$ and $M_y$ which are variable from set-up to set-up can be measured and compensated. Nevertheless, integration of equation (4) yields the profile $Z(x,y)$.

$$Z(x,y) = \int_0^y \left[ \frac{Y(x,y')}{2f} - M_y \right] dy' + K_1 \quad (5)$$

where $K_1$ is a constant of integration.

For a linearly scanned beam (31), the scan speed $V_s$ is given by $V_s = 2 \dot{\theta}_m \cdot f$, where $\dot{\theta}_m$ is the angular speed of the device (16), and $f$ is the focal length of lens (22). Since $\dot{\theta}_m$ is a constant, $y = V_s \cdot t$, where $t$ denotes time. Thus, $dy/dt = V_s$. Therefore, the above equations can be represented with $t$ as the independent variable rather than spatial coordinate $y$ using the substitutions $y = V_s \cdot t$ and $dy/dt = V_s$.

The two-axis photoelectric position sensors (29) and (35) are commercially available solid state devices, e.g. PIN-SC/10 produced by United Detector Technology, Inc., each of which has two outputs per axis. The outputs of each position sensor represent photoelectric currents. The magnitude of each photoelectric current is proportional to the position of the light spot relative to the zero position and to the incident light power. Outputs (70) and (71) correspond to the x axis, and the outputs (72) and (73) correspond to the y axis.

When the spot is centered on the zero position, the photocurrents for each axis are equal. As the spot moves to one side of the zero position along an axis, the photocurrent for that side increases in proportion to the distance moved, and the photocurrent for the other side decreases in proportion to the distance moved. Therefore, the difference between the two photocurrents from an axis is a measure of the distance between the center of the light spot and the zero position of that axis. However, the constant of proportionality is directly a function of the light power in the light spot. Thus, if either the output power of the laser or the reflectivity of the sample varies, or both vary, uncertainty is introduced in the quantitative information relating the position of the spot to the difference between the two photocurrents. In order to overcome this difficulty, it is necessary to use the ratio of the difference to the sum of the two photocurrents per axis as the quantity which unambiguously indicates the position of the light spot.

In FIG. 8, preamplifiers (74), (75), (76) and (77) provide impedance matching and voltage outputs proportional to the photocurrents (70), (71), (72) and (73) respectively for position sensor (29). Amplifiers (82), (83), (84) and (85) yield the required sum and difference signals which are then used as inputs to the dividers (90) and (91) which form the ratio of the difference to the sum. The output (92) of divider (90) is directly proportional to the x coordinate of the position of the spot of light on the sensor (29). Similarly, the ouput (93) of divider (91) is directly proportional to the y coordinate of the position of the spot of light on the sensor (29).

In FIG. 8, the preamplifiers (114), (115), (116) and (117) provide impedance matching and voltage outputs proportional to the photocurrents (110), (111), (112) and (113) respectively. Amplifiers (122), (123), (124) and (125) yield the required sum and difference signals which are then used as inputs to the dividers (130) and (131) which form the ratio of the difference to the sum. The output (132) of divider (130) is directly proportional to the x coordinate of the position of the spot of light on the sensor (35). Similarly, the output (133) of divider (131) is directly proportional to the y coordinate of the position of the spot of light on the sensor (35).

The motion of the reference beam spot is subtracted from the motion of the measurement beam spot with difference amplifiers (94) and (95). Therefore, output (99) corresponds to the differential y axis motion of the measurement beam spot, and output (96) corresponds to the differential x axis motion of the measurement beam spot.

The output (99) is applied to the integrator (101) after passing through the adder (98). The integrator (101) performs the integration expressed in equation (5) per scan line. The timing circuits (104), the switch (97), and the adder (98) function to convert $\delta Z/\delta x$ values to the appropriate constant of integration $K_1$ in equation (5) so that the $Z(x,y)$ profiles for successive scan lines are related to each other.

The integrator output (102) can be displayed on a CRT, i.e. cathode ray tube, or storage oscilloscope (103). A commercially available oscilloscope or CRT monitor is suitable for most applications.

The sensitivity on the CRT monitor is easily varied simply by varying the gain on the appropriate scale.

Description and Explanation of FIG. 9.

FIG. 9 is a schematic block diagram of the circuitry used to yield signals indicative of the properties of the test article surface which are independent of the tilt of the test article surface relative to the apparatus.

In FIG. 9, the outputs (96) and (99) are applied on alternate scans to the input of integrator (159).

Averaging the values of $\delta Z/\delta x$ and $\delta Z/\delta y$ on one scan of the test article, i.e., one revolution of device (16), is used to provide $M_x$ and $M_y$. The analog-to-digital converters (144) and (145) provide digital inputs to the averaging circuitry, i.e., the sum circuits (146) and (147) and the $\div N$ circuits (148) and (149), where N is the number of measurements taken over the test article. The average values of $\delta Z/\delta x$ and $\delta Z/\delta y$, i.e., $M_x$ and $M_y$ respectively, are converted from digital to analog signals by the D-A converters (150) and (151) and are held in the sample and hold circuits (152) and (153).

On the next scan the $M_x$ and $M_y$ values determined on the previous scan are subtracted from the $\delta Z/\delta x$ and $\delta Z/\delta y$ values by amplifiers (141) and (140). On the second scan, output (160) corresponds to $Z(x,y)$ of equation (5). The switches (156) and (157) and adder (158) function to convert $\delta Z/\delta x$ and $M_x$ values to the appropriate constant of integration $K_1$ in equation (5) so that the $Z(x,y)$ profiles for successive scan lines are related to each other.

Obviously, the specific embodiments of the invention herein described can be modified without departing from the invention, which is defined in the claims.

What is claimed is:

1. A device for measuring the light beam deviating properties of a test object which comprises 1) a source of light energy, which produces a narrow light beam 2) means for rotationally scanning said beam 3) means for collimating said rotationally scanned beam to produce a collimated, scanning beam 4) means for passing said collimated, scanning beam over a partially reflective, partially transmissive reference object with a reference surface having light beam deviating properties essentially similar to those of said test object, to produce a reflected reference beam, and a transmitted measurement beam which probes said test object, 5) means for collecting said transmitted measurement beam after it has probed said test object to provide an autoreflected, collected measurement beam 6) means for focusing said reflected reference beam and said autoreflected, collected measurement beam onto separate photoelectric position sensors and 7) means for comparing the outputs of said position sensors to obtain information with respect to the differences in the light beam deviating properties of the test object and the reference surface.

2. The device of claim 1, in which the source of light energy is a gas laser.

3. The device of claim 1, in which the collimated, scanning beam moves in a raster pattern.

4. The device of claim 1, in which the test article is reflective and the means 7) for comparing the outputs of said two position sensors includes 8) means for producing outputs indicative of the two first spatial derivatives of the surface profile of the test article relative to the reference surface 9) means for processing said outputs to yield the surface profiles of said test article and 10) means for processing said outputs to yield said surface profiles independent of the tilt of either said test article or said reference surface.

5. The device of claim 1, in which the test article is transparent, and the device includes a master reflecting surface which is so placed and whose surface contour is so related to the light beam deviating properties of the test object, that said transmitted measurement beam, after it has probed the test object, is autoreflected for double-pass transmission through said test object.

6. The device of claim 1, in which said reference article is slightly tilted with respect to said collimated, scanning light beam.

* * * * *